Aug. 16, 1932.                G. O. HARM                 1,872,283
                          CEMENT LOADING DEVICE
                    Filed Dec. 2, 1930          2 Sheets-Sheet 1

INVENTOR
George O. Harm
BY
Evans & McCoy
ATTORNEYS

Aug. 16, 1932.   G. O. HARM   1,872,283
CEMENT LOADING DEVICE
Filed Dec. 2, 1930   2 Sheets-Sheet 2

INVENTOR
George O. Harm
BY
Evans & McCoy
ATTORNEYS

Patented Aug. 16, 1932

1,872,283

UNITED STATES PATENT OFFICE

GEORGE O. HARM, OF WARREN, OHIO, ASSIGNOR TO THE STEVENS METAL PRODUCTS COMPANY, OF NILES, OHIO, A CORPORATION OF OHIO

CEMENT LOADING DEVICE

Application filed December 2, 1930. Serial No. 499,468.

This invention relates to loading devices and has for its object to provide means for loading separate compartments or receptacles of a truck by which the time required for the loading operation may be considerably reduced.

In transporting material by means of motor trucks, a very important factor in the cost of the transportation is the time consumed in the loading and unloading of the trucks and any saving in the time required for the loading or unloading operation effects a reduction in the cost of handling the materials.

In concrete work, particularly in the construction of roads, it is now common practice to transport the sand, gravel, and cement to the concrete mixers in multi-compartment dump trucks, the truck bodies being divided into compartments, each of a capacity sufficient to contain sand and gravel sufficient for one charge of a mixer and each compartment being provided with a receptacle which holds the amount of cement required for a mixer charge. In the loading of such trucks, it is necessary to fill the compartments of the truck body with sand and gravel and then to fill the receptacles with cement. The filling of the cement receptacles by emptying sacks of cement into them or by discharging the cement from an overhead weighing hopper into the receptacles takes considerable time, and it often happens that several trucks must stand in line to await their turn for receiving the cement.
The present invention has for its object to provide a multi-compartment truck loading device which will permit a very rapid loading of the compartments of a truck and which will effect a considerable saving in the cost of transporting materials, not only by reducing the time required by each truck for the actual loading operation, but also by eliminating loss of operating time due to long waits at the loading station.
More specifically, it is the object of the present invention to provide a loading device which is provided with means for supporting a plurality of measured charges of material in position to be immediately dumped into the compartments of a truck when the truck is driven into load receiving position.

A further object of the invention is to provide a loading system in which the compartments of the truck are filled from independent dumping vehicles, each of a size to hold the charge required for one compartment of the truck, or for a receptacle carried by the truck.

A further object of the invention is to provide a convenient means for handling bulk cement by which the bulk cement may be delivered from a railway car or from a warehouse to a loading platform and discharged into receptacles on a truck with a minimum time required for the truck loading operation.

A further object is to provide a material handling system such as above described, which employs as many dumping vehicles as may be necessary to maintain a reserve supply of loaded vehicles on the loading platform ready to be moved to dumping position, so that a number of trucks can be quickly loaded one after another and loss of operating time due to trucks waiting for others to be loaded is greatly reduced.

With the above and other objects in view, the invention may be said to comprise the loading device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 4 is a sectional elevation on an enlarged scale showing one of the dump carts and one of the delivery chutes.

Figure 4:
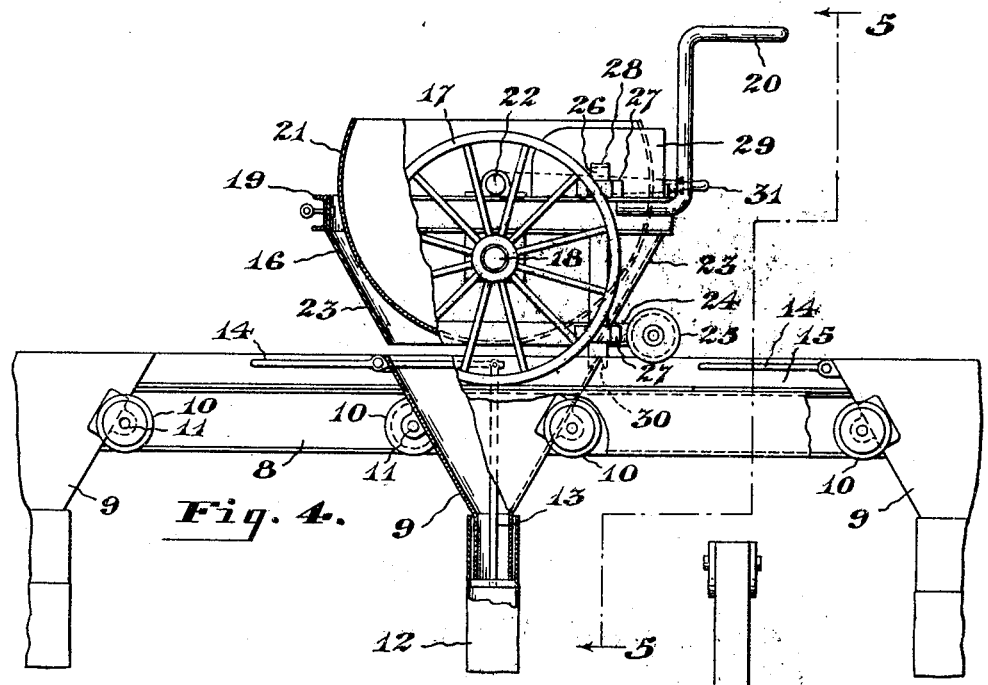
Figures 5, 6:
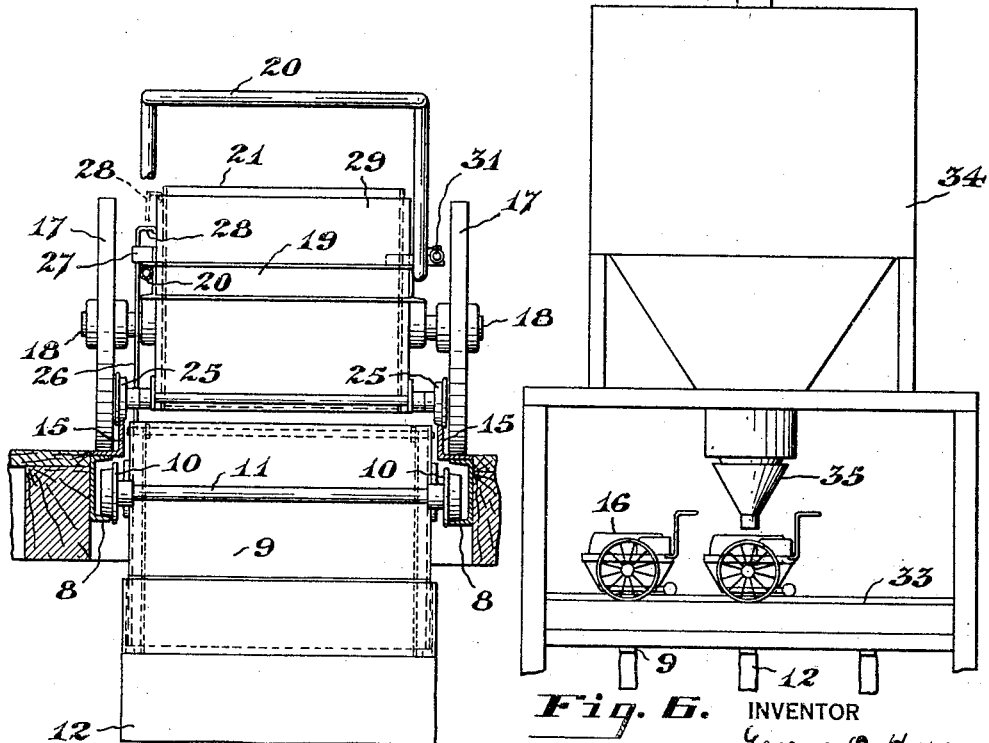

Fig. 5 is a transverse section taken on the line indicated at 5—5 in Fig. 4, showing, in rear elevation, a dump cart and a delivery chute attached thereto.

Fig. 6 is a side elevation showing a modification of the invention in which the dump carts are filled from an overhead hopper.

In the accompanying drawings, the invention is illustrated as applied to the filling of cement receptacles mounted in the compartments of a multi-compartment truck such as commonly used for transporting cement and concrete aggregates to concrete mixers.

Figure 1:
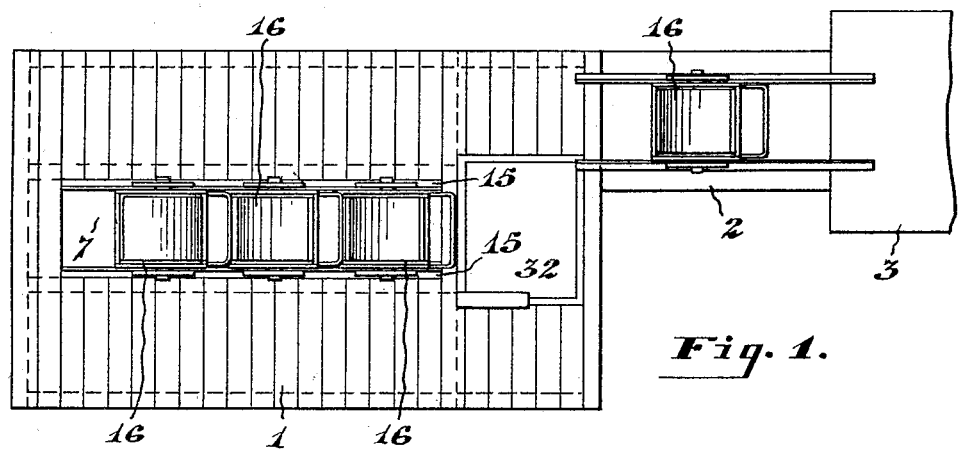
Figure 1 is a plan view of a loading platform showing a plurality of dump carts in a discharging position thereon.
Figure 2:
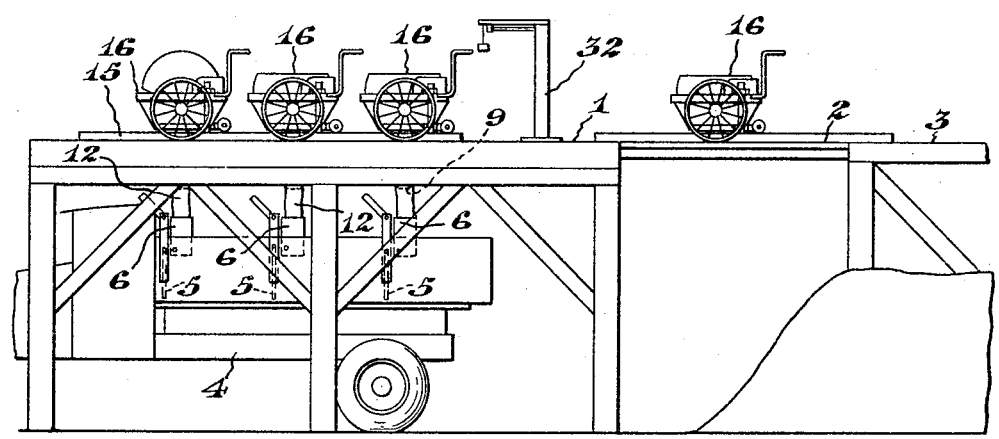
Fig. 2 is a side elevation of a loading platform showing a multi-compartment truck beneath the platform in a position to receive charges of material from the cart on the platform.
Figure 3:
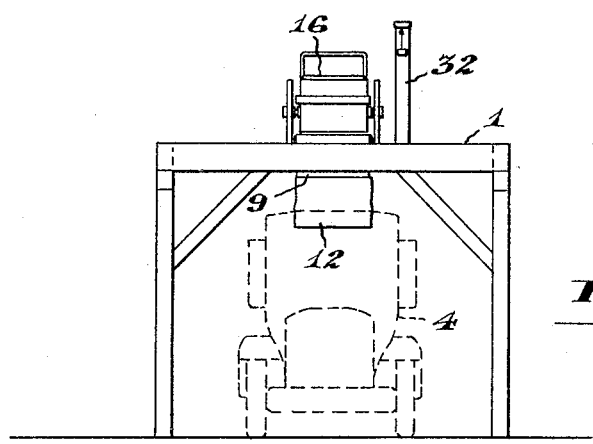
Fig. 3 is an end elevation of the platform showing the truck beneath the platform and a cart in position to discharge into the truck.

As shown in Figs. 1, 2, and 3 of the drawings, there is provided an elevated loading platform 1, which may be connected by a suitable runway 2 with a second platform 3 which may be alongside a railway track at the level of the car floor or which may be the platform of a warehouse. As shown in Figs. 2 and 3, the platform 1 is at an elevation above the ground sufficient to permit a dump truck 4 to be driven beneath it. As shown in Fig. 2, the body of the truck 4 is provided with gates 5 which divide the body of the truck into a plurality of compartments and, within each of these compartments, there is mounted a cement receptacle 6 which is of a size to receive the correct amount of cement for one concrete mixer charge, each of the compartments of the truck being of a size to accommodate the volume of aggregates such as sand and gravel required for one charge of a concrete mixer.

The platform 1 is provided with a longitudinal opening 7, which extends lengthwise over the body of a truck when the truck is in load receiving position. The opposite sides of the opening 7 have inwardly facing channel rails 8 attached thereto, which provide a trackway for funnel shaped delivery chutes 9, which are mounted for longitudinal movement within the opening. The number of chutes 9 corresponds to the number of compartments in the truck to be loaded, and these chutes are adapted to be positioned, one over each of the receptacles of the truck to be filled.

The delivery chutes 9 are supported on wheels 10 running on the channel rails 8 and mounted on the ends of axles 11 attached to the front and rear walls of the chutes. The lower delivery end of each chute 9 is laterally elongated to conform to the shape of the cement receptacles 6 on the trucks and each chute may be provided at its lower end with a flexible extension 12 which may be made of cloth and which is adapted to be inserted into a receptacle 6 of a truck.

Each of the flexible extensions 12 is preferably telescopically connected to the lower end of a chute 9, so that it may be moved upwardly to a position where it will clear the receptacles 6 while the truck is being moved to or from loading position. The flexible extensions 12 may be raised and lowered by means of a lifter bar 13, pivoted at its upper end to a lever 14 mounted on the upper portion of the chute.

On top of each of the channel rails 8, there is mounted an angle bar 15 having a vertical flange which forms a guard rail, and an outwardly projecting base flange attached to the rail 8 upon which it is mounted. For supplying material to the chutes 9, a suitable number of carts 16 are provided. The cars 16 have wheels 17 mounted on short axles 18 attached to opposite sides of a rectangular frame 19, the wheels 17 being spaced apart a distance just sufficient to permit the wheels to straddle the guard rails 15, so that the carts can be run along the platform over the opening 7. Each of the cart frames is provided with rearwardly projecting handles 20 which are conveniently disposed for pushing the cart along the platform.

Within the rectangular frame of each cart, there is mounted a dumping body 21 which is supported for turning movement in the frame on trunnions 22. The bodies 21 are of substantially semi-cylindrical form so that the bodies may turn freely to dumping position within the frame 19. In order to guide material from the tilting body 21 of the cart into a chute 9, beneath the cart, the frame 19 has attached to its front and rear ends downwardly converging shield members 23 which provide a discharge opening at their lower ends approximately the width of one of the chutes into which the material is discharged from the carts. Rearwardly extending arms 24 are attached to the shield members 23 and have mounted thereon flanged wheels 25 which are adapted to run upon the guard rail 15. The auxiliary wheels 25, together with the main wheels 17 provide a stable support for the cart, so that the cart can be left standing on the platform in a substantially level position, the wheels 25 resting on the guide rail 15 when the cart is disposed over the opening 7 and on the platform when the cart is left standing at any point other than over the opening.

Each cart is provided with a vertically disposed latch bar 26 which is mounted for vertical movement in guides 27 on the cart frame and which is provided at its upper end with an inwardly extending hook flange 28 adapted to engage over the top edge of a guard plate 29 attached to the rear end portion of the frame 19.

The lower end of the latch bar 26 is provided with a V-shaped notch 30 which is adapted to engage over the upper edge of the rear wall of any one of the delivery chutes 9. The latch bar of each cart is normally supported in an inoperative position by means of the hook flange 28; but when the cart is brought to a position over one of the shutes 9, the hook flange 28 may be released from the guard plate 29 and the latch bar lowered to a position in which the notch 30 engages over the top edge of the rear wall of the chute, to connect the cart to the chute, so that the cart and chute may be moved bodily as a unit in either direction along the opening 7, either by pushing on the cart from above the platform or by pushing on the chute from beneath the platform. When one of the carts 16 is attached to a chute 9 by means of its latch bar 26, the shield members 23 of the cart are disposed with their lower edges directly over the upper edges of the front and rear walls of the chute, so that when the dumping body 21 of the cart is turned by means of a handle 31 on the tilting body, material will be discharged from the cart into the delivery chute.

The dump carts 16, as they are filled, may be pushed onto the loading platform and may be weighed, if desired, on a suitable scale 32 at one end of the platform. The first loaded cart is run over the opening 7 and is attached to the chute 9 nearest one end of the opening 7, and then other dump carts, after they are filled are placed over the opening 7 and are attached to the remaining chutes, so that measured charges of material are in position ready to be dumped into the compartments of a dump truck, enabling the truck to be loaded in a very short time after being placed under the platform. As soon as one set of carts has been emptied, the empty carts may be pushed off the trackway over the opening and replaced with loaded carts.

It will be understood that as many of the dump carts as desirable may be provided so that a number of loaded carts may be placed on the platform ready to be quickly moved to unloading position, so that a number of trucks may be loaded in quick succession.

In Fig. 6 of the drawings, there is shown a loading platform 33 mounted beneath an overhead bin 34, which is provided at its discharge outlet with a weighing hopper 35 adapted to receive and discharge the desired amount of material into each cart as it is moved beneath the hopper. The weighing hopper 35 will preferably be disposed at one side of the loading trackway on the platform, so that the trucks can be quickly and easily run from the weighing hopper to the loading trackway and from the loading trackway to the weighing hopper for another load of material.

It will be apparent that the present invention provides very simple and inexpensive material handling equipment capable of depositing a number of measured charges of material into separate compartments of a vehicle, in a minimum time, thereby effecting a material economy in the handling of the material.

It will also be apparent that a number of trucks may be successively loaded in a short space of time, by providing a suitable number of loaded dump carts on the loading platforms ready to be pushed into place over the opening 7 and that loss of truck operating time due to waits at the loading station are reduced to a minimum.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A loading device comprising an elevated platform having an elongated opening, a plurality of chutes mounted in the opening for independent movement longitudinally thereof, a plurality of dumping vehicles adapted to travel along the platform, a runway for guiding the vehicles along the platform over the opening longitudinally thereof, and means for detachably connecting the vehicles to the chutes for movement therewith and for holding the vehicles in position to deliver their material into the chutes.

2. A loading device comprising an elevated platform having an elongated opening, a plurality of chutes mounted in the opening for independent movement longitudinally thereof, a plurality of dumping vehicles adapted to travel along the platform, a runway for guiding the vehicles along the platform over the opening longitudinally thereof, and means on each of the vehicles for detachably connecting the same to any one of said chutes for movement therewith and for holding the vehicle in position to deliver its material into the chute.

3. A loading device comprising an elevated platform having a longitudinal opening therein, said platform having guard rails extending along opposite sides of the opening, a plurality of dump carts adapted to travel on the platform over the opening with a supporting wheel straddling the guard rails, a plurality of delivery chutes mounted in the opening to travel longitudinally thereof, and means carried by each of the carts for detachably securing the same to a delivery chute for movement therewith along the opening and for maintaining the cart and chute in relative positions in which material may be dumped from the cart into the chute.

4. A loading device comprising an elevated platform having a longitudinal opening therein, said platform having guard rails extending along opposite sides of the opening, a plurality of carts adapted to travel along the platform with their supporting wheels straddling the guard rails, each of said carts comprising a frame carried by the supporting wheels and a dumping body mounted to turn in said frame, a plurality of funnel shaped delivery chutes mounted in said opening for movement independently longitudinally of the opening, and a latch member carried by the frame of each cart and engageable with any one of the chutes for securing the cart to the chute for movement therewith, and for positioning the cart to dump into the chute.

5. A loading device comprising an elevated platform having a longitudinal opening, said platform having guard rails along opposite sides of the opening, a plurality of dump carts adapted to travel on the platform with their wheels straddling said guard rails, each of said carts having an axle, a frame attached to the axle, and a body mounted to turn in the frame, said frame having flanged wheels adapted to travel on said guard rails, a plurality of funnel shaped chutes mounted for independent movements longitudinally of said opening, the upper ends of the chutes being of substantially the same width as the opening and positioned between the guard rails, and latch members carried by the cart frames which are movable into engagement with a portion of any one of the chutes to attach the cart to the chute for movement therewith along the opening, with the cart in a position to dump into the chute.

6. A loading device comprising an elevated platform having a longitudinal opening, said platform having guard rails along opposite sides of said opening, a plurality of funnel shaped delivery chutes mounted in said opening for independent movement longitudinally thereof, said chutes being of substantially the same width as the opening and positioned between the guard rails, a plurality of dumping carts adapted to travel on the platform with the supporting wheels thereof straddling said guard rails, each cart comprising a frame secured to the axle and a dumping body mounted to turn about a horizontal axis in said frame, downwardly converging shield members attached to opposite ends of the frame and adapted to be positioned over the upper ends of the chute member to direct the material into the chute, and means for detachably connecting anyone of the carts to any one of the chutes for movement therewith along the opening and in a position to deliver material into the chute.

7. A device for loading multi-compartment trucks comprising in combination a platform elevated at a height to receive a truck beneath it, said platform having an elongated opening, a plurality of chutes mounted for independent movements in the opening and adapted to be positioned to deliver into separate compartments of the truck, and means for delivering charges of material to the chutes, said means comprising a plurality of carts, dumping bodies carried by the carts and a latch carried by each of the carts for engagement with one of the chutes whereby each respective engaged cart and chute can be moved as a unit along said opening in the platform.

In testimony whereof I affix my signature.

GEORGE O. HARM.